US012770063B2

(12) United States Patent
Rajasekar

(10) Patent No.: US 12,770,063 B2
(45) Date of Patent: Oct. 20, 2026

(54) AUTOMATED CHECKS OF MACHINE LEARNING SCENARIO PREREQUISITES

(71) Applicant: SAP SE, Walldorf (DE)

(72) Inventor: Manikandan Rajasekar, Chennai (IN)

(73) Assignee: SAP SE, Walldorf (DE)

( * ) Notice: Subject to any disclaimer, the term of this patent is extended or adjusted under 35 U.S.C. 154(b) by 590 days.

(21) Appl. No.: 18/366,874

(22) Filed: Aug. 8, 2023

(65) Prior Publication Data

US 2025/0053856 A1 Feb. 13, 2025

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

2021/0241168 A1* 8/2021 Sarferaz .................. G06F 16/27
2021/0342738 A1* 11/2021 Sarferaz ................. G06Q 10/10
2022/0230091 A1* 7/2022 Rajasekar ................ G06N 5/04

* cited by examiner

*Primary Examiner* — Eileen M Adams
(74) *Attorney, Agent, or Firm* — Buckley, Maschoff & Talwalkar LLC

(57) ABSTRACT

Systems and methods include reception receive of an instruction from an operator to check compatibility of an application executing on an application server with a machine learning scenario, the machine learning scenario comprising a machine learning model and a training pipeline, determination of a first plurality of object instances associated with the machine learning scenario, each of the first plurality of object instances comprising logic executable by a first object executor executing in the application server to perform a prerequisite check associated with the machine learning scenario and the application, instruction of the first object executor to execute the logic of the first plurality of object instances, and reception of first results corresponding to the executed logic from the first object executor.

15 Claims, 12 Drawing Sheets

500

```
# Schema of the CheckObject Declaration
version: "1.0"
type: checkObject
metadata:
name: # name of the CheckObject
id: # identified for the CheckObject
uuid: # UUID generated for the CheckObject in runtime
details:
classification: # Classification type of the check
type: # type of the check i.e. data quality, data quantity, performance,
etc.
mandatory: # check is mandatory or not
message: # simple description of the check
logic:
type: # specify the type of logic like RegX, Database, Class etc
details:
# logic-specific additional details
parameters:
- name: # name of the parameter
dataType: # data type of the parameter
type: # how the value will be generated - automated, user input
output:
- name: # name of the output
result: # result of the output
messages:
- description: # descriptive message
type: # type of message error, info, success
msgCode: # numerical code to identify the message
code: # numerical code
dependencies:
- id: # dependent check object with its state
state: # the state expected for the dependent checkObject
sequence: # sequence should be followed or not
```

*FIG. 5*

600

```
version: "1.0"
type: checkObject
metadata:
name: "checkobject1"
id: "check-01"
uuid: "ba8c7690-08de24b5c587"
details:
classification: "booleanCheck"
type: "dataQuality"
mandatory: true
message: "data quality check for column values"
logic:
type: "$check.type.regX"
details:
condition: "{1-9,A-z/z}"
target: "$check.table['MARA'].column['MRRT'].value[*]"
parameters:
- name: range
dataType: string
type: autoGenerated
- name: year
dataType: year
type: userInput
output:
- name: validity
result: boolean
messages:
- description: "Check lead to an error due to missing values"
type: error
msgCode: "e01"
code: 500
- description: "Check is successful as it meets the baseline"
type: success
msgCode: "s01"
code: 200
depdencies:
- id: "check02"
state: success
- id: "check03"
state: success
sequence: false
```

*FIG. 6*

AUTOMATED CHECKS OF MACHINE LEARNING SCENARIO PREREQUISITES

BACKGROUND

Modern database systems store vast amounts of data for their respective enterprises. Applications may access this stored data in order to perform various functions. The functions may include estimation or forecasting of data values based on stored data. Such estimation or forecasting is increasingly provided by trained neural networks, or machine learning models.

A machine learning model may be trained to infer a value of a target (e.g., delivery date) based on a set of inputs (e.g., fields of a specific sales order). The training may be based on historical data (e.g., a large number of sales orders and their respective delivery dates). Training causes the machine learning model to learn patterns in the historical data which allow it to infer a target value (e.g., a delivery date) based on new input data (e.g., a new sales order).

The accuracy of a trained model is influenced by many factors, including the volume, age, and distribution of the training data. Successful training and use of a machine learning model is also subject to the existence of appropriate technical configurations of the service which will provide the model training and of the application which will use the trained model.

A machine learning scenario specifies a model, training data, validation data, a training pipeline, and an inference pipeline. To ensure suitable training, operation and performance, a machine learning scenario is typically associated with prerequisites regarding its training data and the configuration of the systems in which it will be trained and used. The prerequisites may specify, for example, minimum training data size, minimum training data variance, appropriate training data sectors, and technical configuration requirements.

Currently, prerequisites associated with a machine learning scenario are discovered manually during implementation, testing and validation of the machine learning scenario. Such ad-hoc discovery leads to significant delays in the deployment of machine learning scenarios and corresponding negative effects on department budgets and user trust.

In some situations, prerequisites are communicated via text documentation from a machine learning scenario provider to a technical administrator in charge of implementing the machine learning scenario in an organization's landscape. Performing manual checks based on such documentation is error-prone and time-consuming, particularly in cases where the prerequisites affect components with multiple tool endpoints, user interfaces (UIs) and authorizations. Moreover, enabling a same machine learning scenario in multiple software instances (e.g., dedicated to specific regions or specific lines of business) requires multiplicative effort. Such manual checks must also be updated for every new version of the machine learning scenario.

In an on-premise landscape, a technical administrator uses multiple tools and various authorizations to manually check prerequisites associated with a desired machine learning scenario. This is not possible in cloud environments, as the application and machine learning systems generally prohibit direct access to the data sources and configuration layers.

Systems are desired to efficiently characterize prerequisites of a machine learning scenario and to efficiently perform repeatable checks on multiple intended machine learning scenario deployments based on the characterizations.

BRIEF DESCRIPTION OF THE DRAWINGS

FIG. 5 illustrates a check object schema according to some embodiments.

FIG. 6 illustrates a check object instance according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Briefly, some embodiments provide technical objects representing machine learning scenario prerequisites and provide systems to efficiently check the prerequisites against a landscape using instances of the technical objects. The checks may be performed repeatably and automatically in different application and machine learning service runtimes. The checks may also be performed across runtimes located in the cloud and on-premise.

Embodiments may simplify the consumption of machine learning scenarios. Consequently, machine learning scenarios can be implemented on a large scale and in multiple deployments with a low error rate. By reducing a total cost of deployment, application developers would be encouraged to incorporate machine learning intelligence into their applications.

Figure 1:
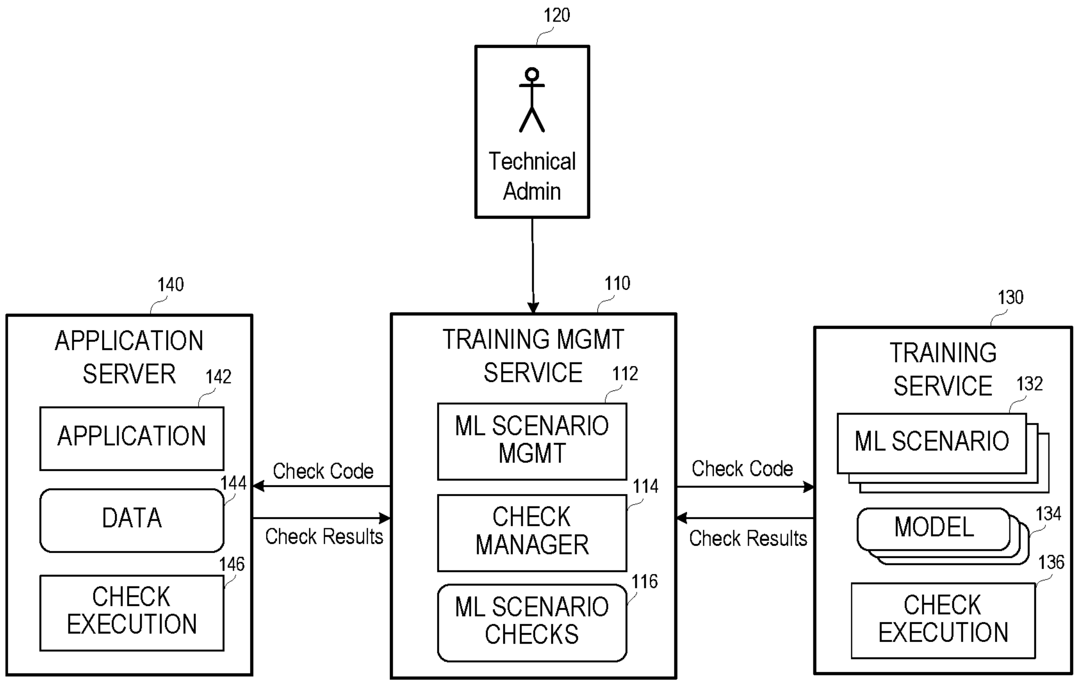
FIG. 1 is a block diagram of an architecture to execute checks of machine learning scenario prerequisites according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service). Such implementations apportion computing resources elastically according to demand, need, price, and/or any other metric.

Training management service 110 include machine learning scenario management component 112 to receive and respond to machine learning-related requests from technical administrator system 120. The requests may comprise requests to define a machine learning scenario within training service 130, to train a model using a machine learning scenario of training service 130, and to deploy a machine learning scenario and trained model for use by application 142 executing on application server 140. The requests may also comprise a request to conduct checks in order to determine whether data 144 and the configurations of server 140, application 142 and/or training service 130 satisfy prerequisites associated with a particular machine learning scenario.

Training service 130 may be provided by the same provider as training management service 110 or by a different provider. Training service 130 stores one or more machine learning scenarios 132, each of which may specify several elements including a model, training data, validation data, a training pipeline, and/or an inference pipeline. Two or more machine learning scenarios 132 may share the same model, data and/or pipeline. In some embodiments, training service 130 may provide one or more different implementations of each element and technical administrator system 120 may communicate with machine learning scenario management component 112 to define a machine learning scenario 132 by selecting a combination of the implementations.

Models 134 may comprise any type of machine learning-compatible network, algorithm, decision tree, etc., that is or becomes known. Models 134 may be designed to perform classification, regression or any other suitable tasks. One or more of models 134 may comprise a network of nodes which receive input, change internal state according to that input, and produce output depending on the input and internal state. The output of certain nodes is connected to the input of other nodes to form a directed and weighted graph. The weights are modified during training using learning algorithms, examples of which will be described below.

Check execution component 136 may comprise an installable plug-in for use by disparate application servers and training services. Check execution component 136 is capable of executing specified checks of training service 130 as well as generating executable checks for the given environment. Generally, the checks may comprise code representing logic which is interpretable and executable by check execution component 136. Further details of such checks and their implementation are provided below.

Check manager 114 may comprise a plug-and-play component to machine learning scenario management component 112. Check manager 114 may operate to import machine learning scenario checks 116 which are generated and released by providers of machine learning scenarios. Check manager 114 may also connect with the check execution components of a training service and of an application server via an HTTP API layer and distribute corresponding checks thereto for execution. The executions may be orchestrated by check manager 114, and the execution results fetched by check manager 114 across the landscape. Moreover, the execution results may be passed to machine learning scenario management component 112 for presentation to technical administrator system 120.

Check execution component 146 is similar to check execution component 136 but executes checks associated with application server 140. These checks may, for example, check whether the quantity and/or distribution of available is suitable for training per a given machine learning scenario, as well as whether required authorizations to access the data exist. Application server 140 may comprise an on-premise or cloud-based server providing an execution platform and services to applications such as application 142. Application 142 may provide functions to users based on data 144. Data 144 may be stored in any suitable storage system such as a database system, which may be partially or fully remote from application server 140. Application 142 may create, read, update and delete data of data 144 based on a data schema consisting of semantic objects as is known in the art. For instance, data 144 may comprise relational database tables and views whose columns conform to a data schema defined by metadata stored in data 144.

An object may comprise metadata describing the structure of data which defines a corresponding logical entity, while an object instance comprises data conforming to the structure and specific to a single instance of the logical entity. The data of object instances of a given object may be stored in a same one or more database tables specified by the metadata. For example, application 142 may define a SalesOrder object type and data 144 may comprise data associated with each of many specific sales orders.

Figure 2:
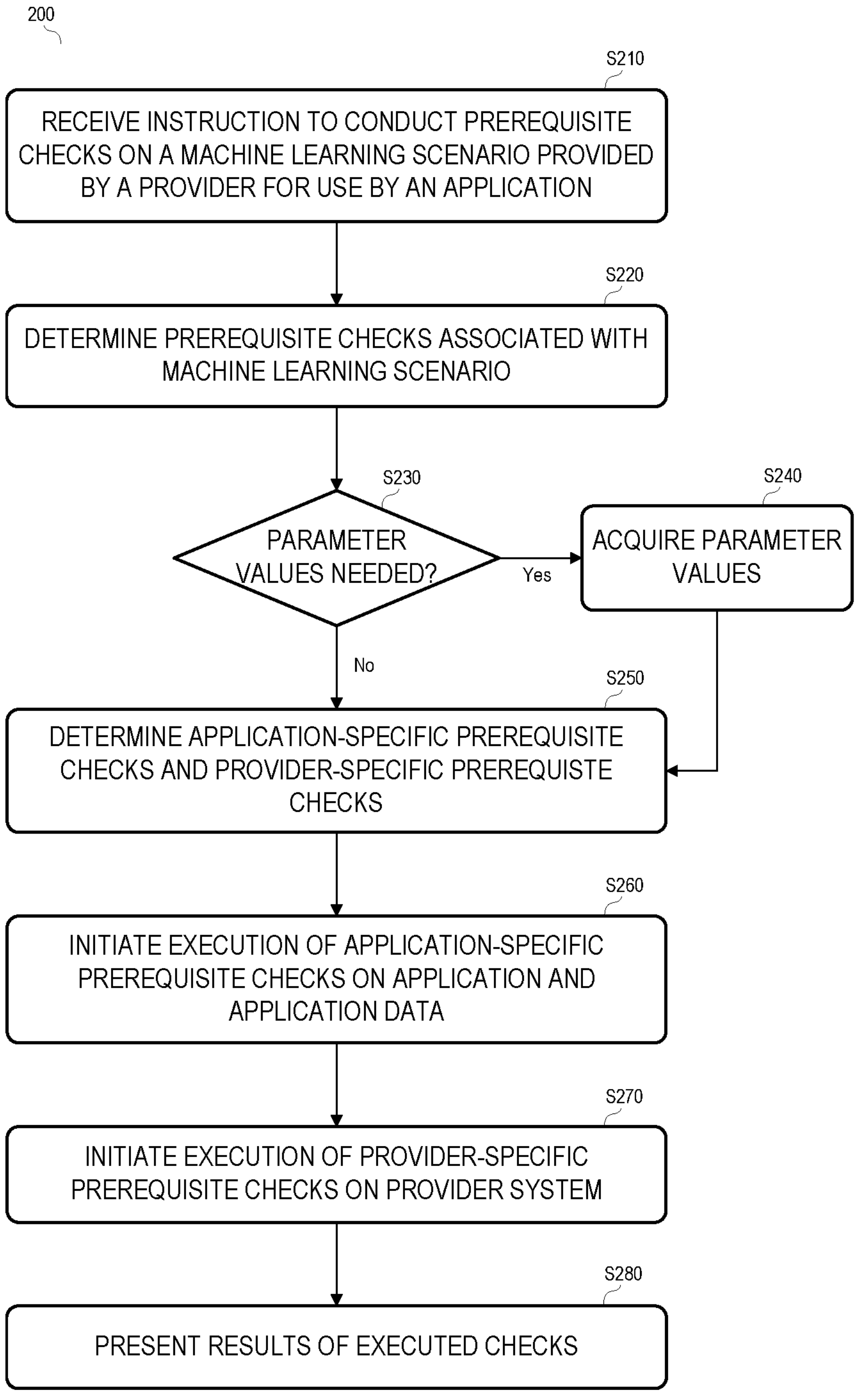
FIG. 2 is a flow diagram of a process to execute checks of machine learning scenario prerequisites according to some embodiments.

FIG. 2 comprises a flow diagram of process 200 to execute checks of machine learning scenario prerequisites according to some embodiments. Process 200 will be described with respect to the elements of system 100, but embodiments are not limited thereto.

Process 200 and all other processes mentioned herein may be embodied in processor-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, an instruction is received to conduct prerequisite checks on a machine learning scenario provided by a provider for use by an application. In one example, the machine learning scenario may be selected by a technical administrator for deployment for use with the application. However, prior to such deployment, the technical administrator issues the instruction received at S21 in order to ensure that the environment is suitable for deployment of the machine learning scenario.

For example, with respect to FIG. 1, training service 130 may provide multiple machine learning scenarios 132. Each of scenarios 132 is associated with prerequisite checks which may be generated by the developers of each scenario 132 and released to management component 112 for storage in machine learning scenario checks 116.

Figure 3:
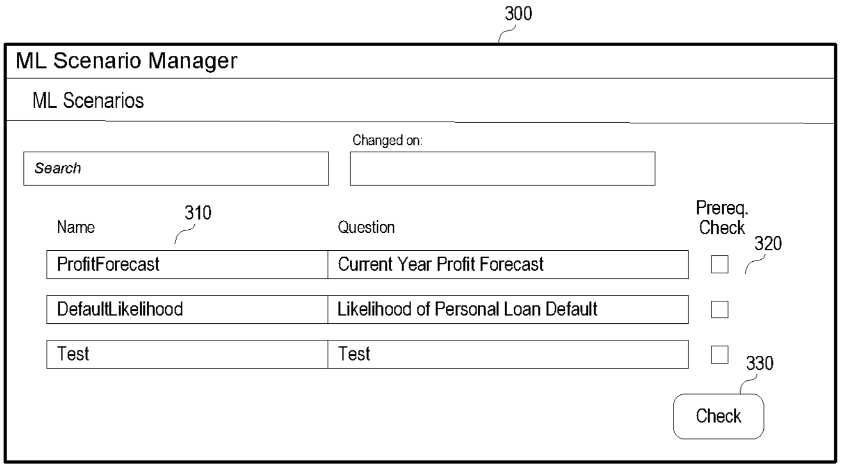
FIG. 3 is a user interface of a machine learning scenario management application according to some embodiments.

FIG. 3 illustrates user interface 300 of a machine learning scenario management component such as machine learning scenario management component 112 according to some embodiments. Technical administrator system 120 may execute a Web browser to access machine learning scenario management component 112 via HyperText Transfer Protocol and receive user interface 300 in return.

Interface 300 includes list 310 of three machine learning scenarios which are available for deployment. Associated with each scenario is a checkbox 320 which may be selected by a technical administrator to indicate an instruction to perform prerequisite checks for an associated machine learning scenario. Accordingly, selection of Check control 330 causes the instruction to be received at S210.

The prerequisite checks associated with the machine learning scenario are determined at S220. According to some embodiments, each of machine learning scenario checks 116 is associated with one or more machine learning scenarios. S220 therefore consists of determining which of checks 116 are associated with the selected machine learning scenario.

Figure 4:
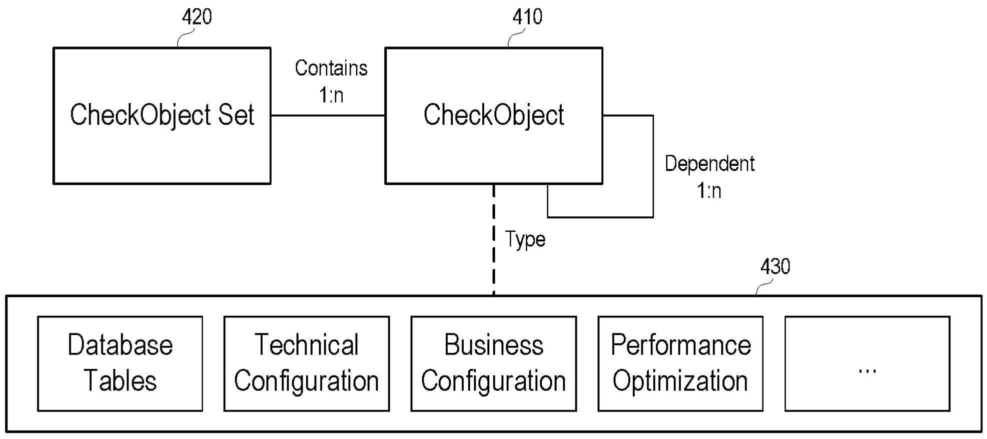
FIG. 4 is a modelling diagram of a check object according to some embodiments.

FIG. 4 is a modeling diagram according to some embodiments. Each check of machine learning scenario checks 116 is defined by an instance of CheckObject 410. According to some embodiments, CheckObject 410 includes metadata such as name, identifier, type, a description of a condition or logic to check in the system, a parameter template defining automated, derived, and manually provided parameters needed to perform the check, dependency references to other CheckObjects 410, and information regarding execution sequence and conditional flow of dependent CheckObjects 410.

CheckObject 410 may be defined using Yet Another Markup Language (YAML) code. Code 500 of FIG. 5 illustrates one example of CheckObject 410 according to some embodiments. Code 600 of FIG. 6 is an example instance of CheckObject 410 as defined by code 500.

An instance of CheckObject set 420 includes one or more instances of CheckObject 410. Each machine learning scenario may be associated with a single instance of CheckObject set 420, and an instance of CheckObject 410 may belong to more than one instance of CheckObject set 420. Instances of CheckObject Set 420 and CheckObject 410 are interpreted by check execution components, which also perform the technical execution of logic that is specified by the instances of CheckObject 410.

Prerequisite checks may be classified as Decisive Checks or Behavior Checks. A Decisive Check returns a Boolean value which may be interpreted as success or failure. An example of a Decisive Check is a check of whether a table 'XYZ' includes at least 10K records. A Behavior Check can return results which provide information regarding implementation possibility and consequences. For example, a behavior check may determine a number of records in a table and the percentage of a particular record type, and provide a result characterizing the determinations (e.g., 25K Records, 25% &&<50% of type 'A' will lead to inconsistent results if used with selection machine learning scenario).

As further shown in FIG. 4, each instance of CheckObject 410 may be associated with a type 430. Instances associated with a database tables type 430 are typically executed by a check execution component of an application server (i.e., of the application which manages the training data) and may include data volume and data quality checks. Examples include checks of a number of records on a specific database table, a number of records on a database table satisfying specific WHERE clauses (e.g., associated with a specified time period or other conditions), a number of records of a specific data classification, and a specified data pattern.

A technical configuration type 430 may include checks of whether required user profiles exist in the application server and the machine learning service, and whether a user profile with machine learning operation authorizations exists (e.g., executing training pipeline, initiating inference call). A business configuration type 430 may include checks of whether a particular configuration parameter value (e.g., EN, DE) exists in the application server, and whether appropriate configurations exist between the training management service and the training service and between the training management service and the application server(s).

Performance optimization types 430 may include checks of a specified data source to ensure optimization for training, query execution performance, and delta queries execution. Other checks may include determination of whether the application is configured to receive events associated with machine learning scenarios, whether any specifically-required application versions, add-ons, or patches are installed.

Returning to process 200, at S230 it is determined whether any parameter values are needed to execute any of the checks determined at S220. The determination may be based on the code of the determined checks which is stored in training management service 110. As shown in examples 500 and 600, a check may specify one or more parameters including a name, a data type and a type (e.g., autoGenerated, userInput, derived).

Figure 7:
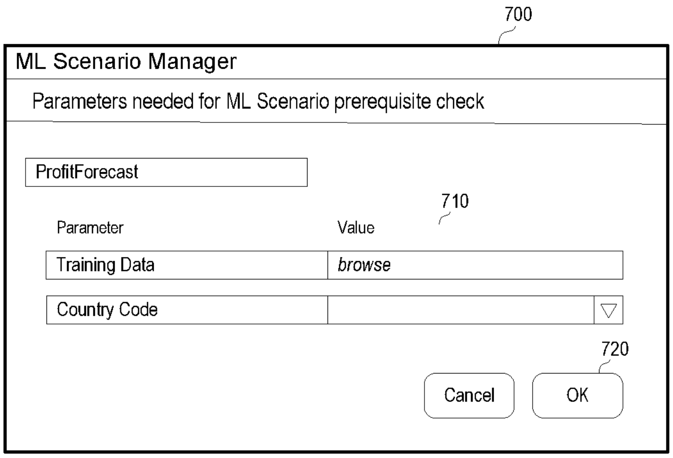
FIG. 7 is a user interface of a machine learning scenario management application for inputting prerequisite check parameter values according to some embodiments.

The determination at S230 may be positive if any of the determined checks are associated with at least one parameter of type 'userInput'. If so, flow proceeds to S240 to acquire the values of the at least one parameter. FIG. 7 is a view of interface 700 which may be presented to a technical administrator at S240. Interface 700 includes area 710 listing the parameters and providing fields for inputting corresponding values. Selection of OK control 720 submits the values and flow then proceeds to S250. Flow proceeds directly from S230 to S250 if no parameter values are needed.

At S250, application-specific and provider-specific checks are determined from the checks determined at S220. The application-specific checks are sent to a check execution component of the application server to initiate execution thereof at S260. Similarly, at S270, the provider-specific checks are sent to a check execution component of the training service providing the machine learning scenario to initiate execution thereof. As mentioned above, the check execution components of the application server and of the training service are capable of interpreting logic of different types which is specified in the CheckObject instances (e.g., RegX, Database, Class).

Figure 8:
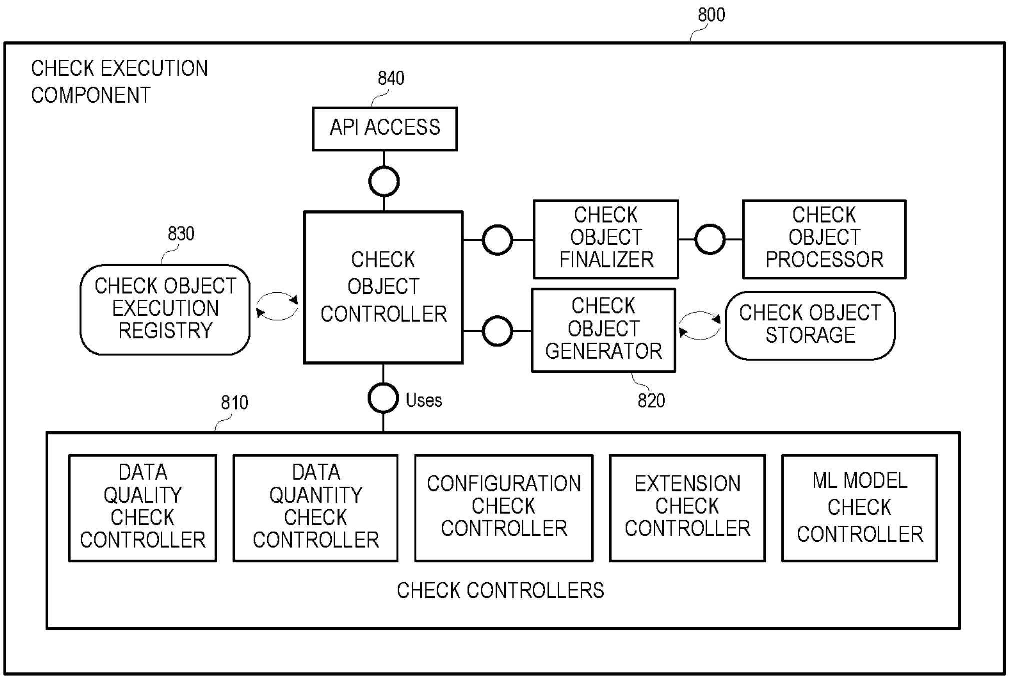
FIG. 8 is a block diagram of a check execution component according to some embodiments.
Figure 9:
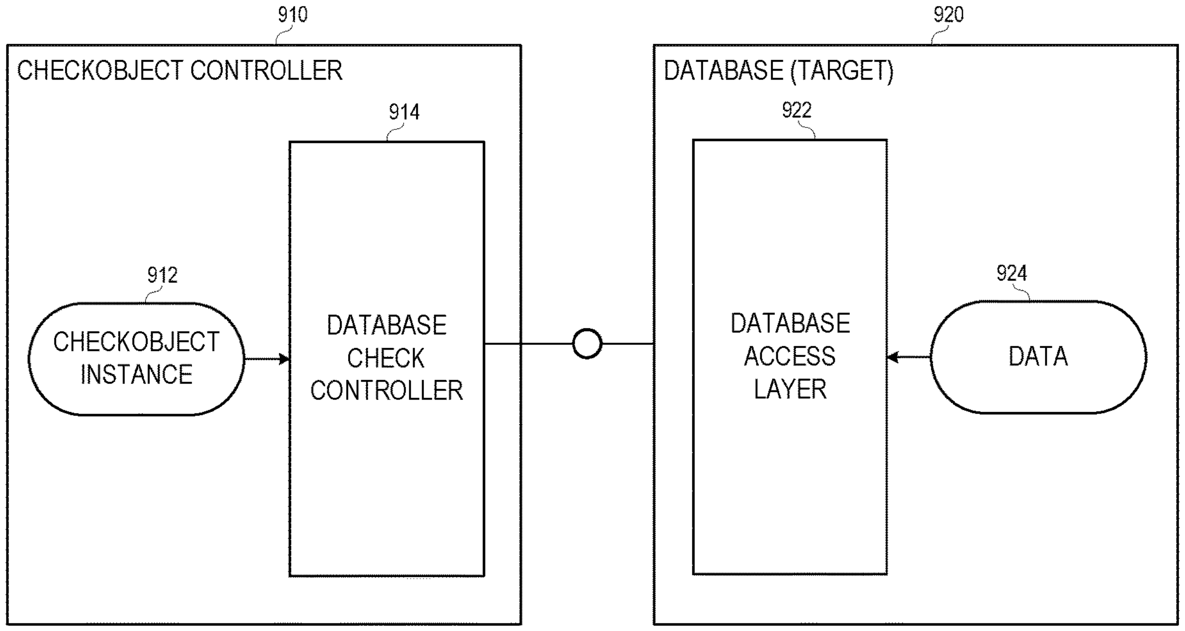
FIG. 9 is a block diagram illustrating operation of a database check controller of a check object executor component according to some embodiments.

FIG. 8 is a block diagram of a check execution component according to some embodiments. Check execution component 800 includes multiple check controllers 810 which are capable of interacting with different interfaces (e.g., database access interface) and frameworks (e.g., configuration framework interface) to execute CheckObject instances. For example, as shown in FIG. 9, database check controller 914 of CheckObject controller 910 may interpret information of a database logic type of CheckObject instance 910 to access data 924 of database 920 via access layer 922 and to perform a check thereon.

CheckObject generator 820 may convert checks into a declaration such as code 600 based on schema 500 to store and distribute the information. The results of each check execution are stored in registry 830, and are also exposed via API access 840 to a check manager.

The format of the results of a given check may be specified in the code of the corresponding CheckObject instance. The results are passed to a machine learning scenario management component for presentation to a technical administrator at S280. Based on the results, the technical administrator may determine whether to deploy the machine learning scenario in the landscape. Such deployment may include executing a training pipeline specified in the scenario to train a specified model using specified training data, and executing an inference pipeline to deploy the trained model for use by the application.

Figure 10:
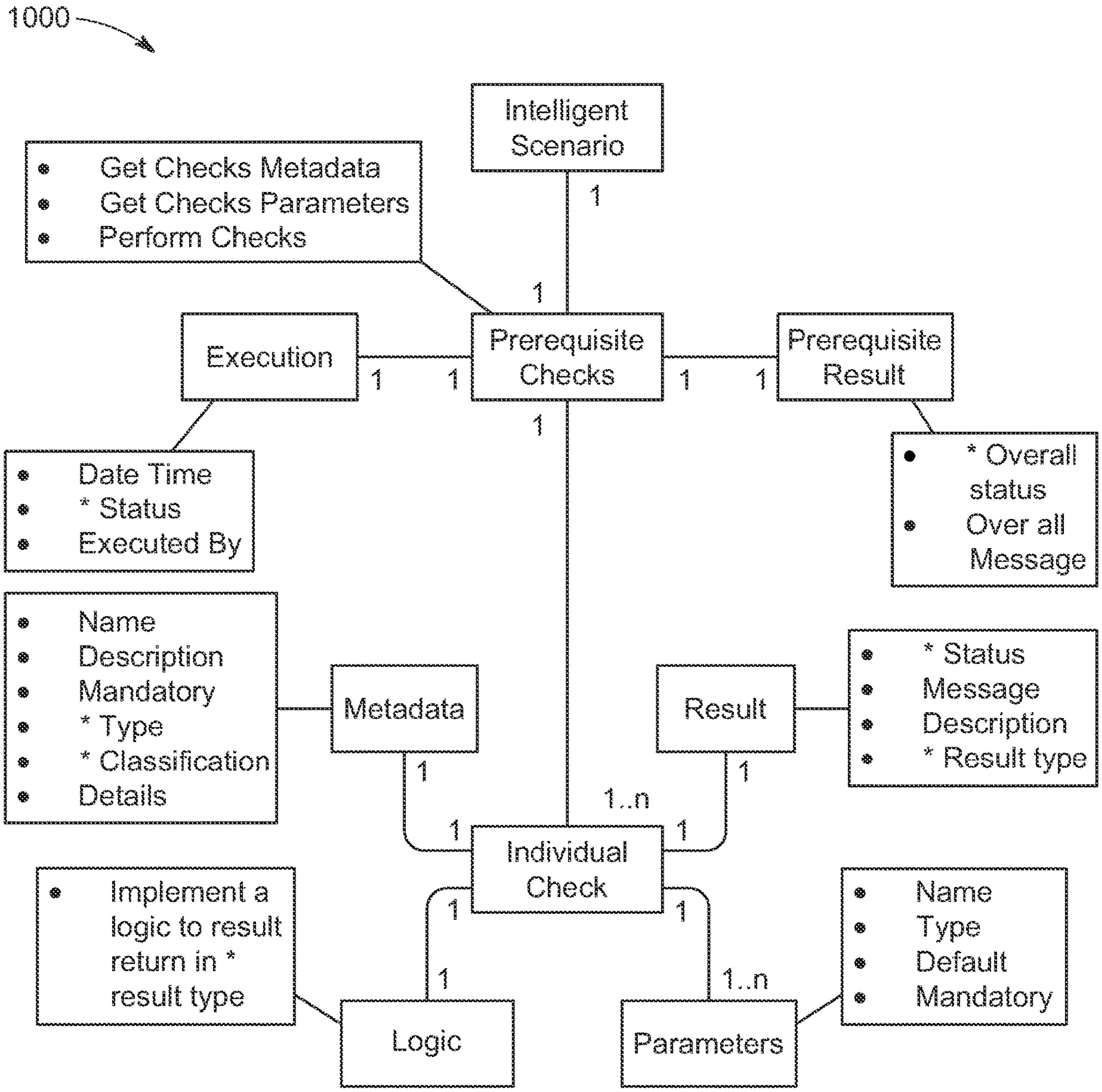
FIG. 10 is a data model associated with prerequisite checks according to some embodiments.

FIG. 10 is a modeling diagram illustrating relationships between machine learning scenarios, CheckObject sets, CheckObjects and their corresponding entities according to some embodiments. Embodiments are not limited to diagram 1000.

Figure 11:
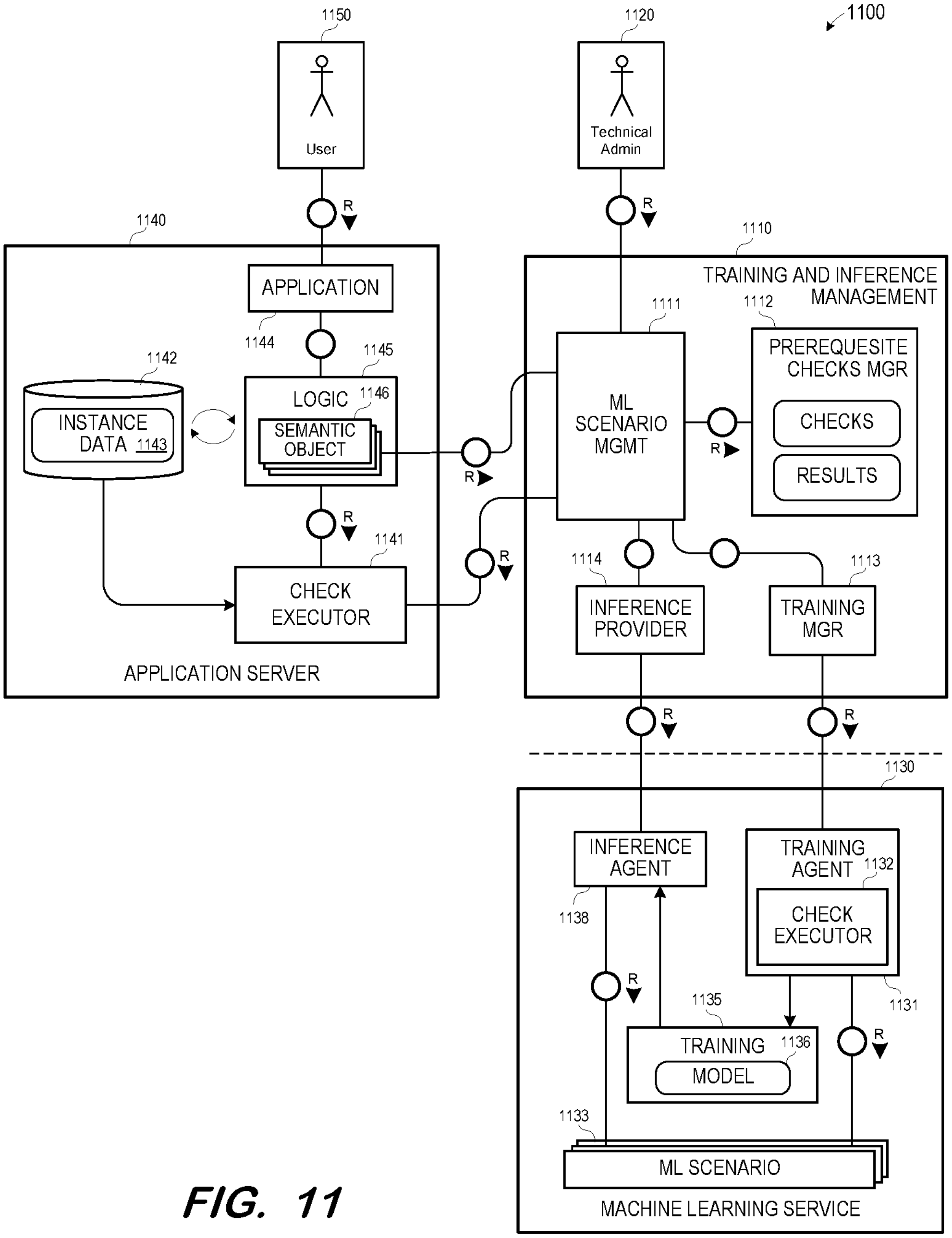
FIG. 11 is a block diagram of an architecture to execute checks of machine learning scenario prerequisites according to some embodiments.

FIG. 11 is a block diagram of system 1100 to conduct prerequisite checks for machine learning scenarios according to some embodiments.

Training and inference management system 1110 may perform the above-described functions of training management system 110. Generally, machine learning scenario management component 1111 of training and inference management system 1110 may receive a request from technical administrator system 1120 to conduct prerequisite checks associated with one of machine learning scenarios 1133 provided by machine learning service 1130. In response, component 1111 queries prerequisite checks manager 1112 for checks corresponding to the machine learning scenario 1133.

Machine learning scenario management component 1111 sends appropriate ones of the checks to check executor 1132 of training agent 1131 via training manager 1113, and appropriate ones of the checks to check executor 1142 of application server 1140. For example, check executor 1132 may execute checks associated with configuration and resources of service 1130, while check executor 1141 may execute checks associated with the configuration of application 1144 and with instance data 1143 stored in data storage 1142. Results of the check execution are returned to management component 1111 and stored in prerequisite checks manager 1112.

Application 1144 may comprise a Web application which receives HyperText Transfer Protocol requests from user 1150 and returns data thereto. For example, application 1144 may comprise a supply chain management application which user 1150 accesses to perform demand forecasting, inventory management, etc. In response to input from user 1150, application 1144 accesses data from instance data 1143 via logic 1145, processes the data if needed, and provides user 1150 with user interfaces including the data.

Training and inference management system 1110 may also receive requests from application 1144 to perform an inference using the machine learning scenario 1133 based on instance data 1143. In response to this request, management component 1111 uses inference provider to request an inference from inference agent 1138. Inference agent 1138 identifies a trained model 1136 corresponding to the machine learning scenario 1133 and applies the trained model to the instance data 1143 to infer an output. The output is then returned to application server 1140.

Figure 12:
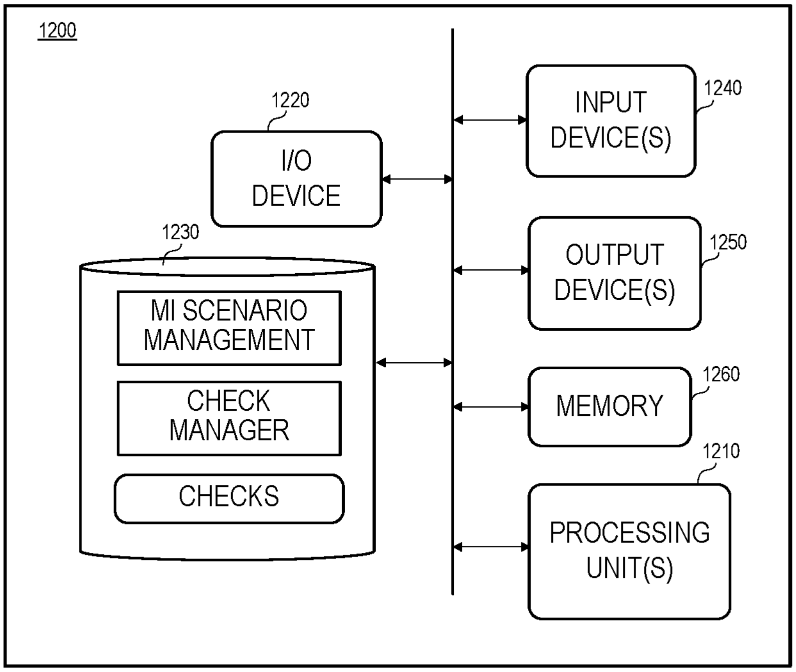
FIG. 12 is a block diagram of a hardware system providing training and inference management according to some embodiments.

FIG. 12 is a block diagram of a hardware system providing training and inference management according to some embodiments. Hardware system 1200 may comprise a general-purpose computing apparatus and may execute program code to perform any of the functions described herein. Hardware system 1200 may be implemented by a distributed cloud-based server and may comprise an implementation of training and inference management system 1110 in some embodiments. Hardware system 1200 may include other unshown elements according to some embodiments.

Hardware system 1200 includes processing unit(s) 1210 operatively coupled to I/O device 1220, data storage device 1230, one or more input devices 1240, one or more output devices 1250 and memory 1260. Communication device 1220 may facilitate communication with external devices, such as an external network, the cloud, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into hardware system 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, and RAM devices, while memory 1260 may comprise a RAM device.

Data storage device 1230 stores program code executed by processing unit(s) 1210 to cause server 1200 to implement any of the components and execute any one or more of the processes described herein. Embodiments are not limited to execution of these processes by a single computing device. Data storage device 1230 may also store data and other program code for providing additional functionality and/or which are necessary for operation of hardware system 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

a memory storing processor-executable program code;

at least one hardware processing unit to execute the processor-executable program code to cause the system to:

receive an instruction to determine whether an application executing on an application server is compatible with a machine learning scenario, the machine learning scenario comprising a machine learning model and a training pipeline;

determine a first plurality of object instances associated with the machine learning scenario, each of the first plurality of object instances comprising logic executable to perform a prerequisite check associated with the machine learning scenario and the application;

determine that the prerequisite check performed by execution of the logic of one of the first plurality of object instances requires a parameter value;

request the parameter value from an operator; and instruct the application server to execute the logic of the one of the first plurality of object instances based on the parameter value and to return corresponding first results.

2. A system according to claim 1, the at least one hardware processing unit to execute the processor-executable program code to cause the system to:

determine a second plurality of object instances associated with the machine learning scenario, each of the second plurality of object instances comprising logic executable to perform a prerequisite check associated with the machine learning scenario and a machine learning service providing the machine learning scenario; and instruct the machine learning service to execute the logic of the second plurality of object instances and to return corresponding second results.

3. A system according to claim 2, the at least one hardware processing unit to execute the processor-executable program code to cause the system to:

determine, prior to instructing the machine learning service to execute the logic of the second plurality of object instances, that the prerequisite check performed by execution of the logic of one of the second plurality of object instances requires a second parameter value; and request the second parameter value from an operator, wherein instruction of the machine learning service to execute the logic of the second plurality of object instances comprises instruction of the machine learning service to execute the logic of the one of the second plurality of object instances based on the second parameter value.

4. A system according to claim 1, wherein one of the first plurality of object instances is dependent on another one of the first plurality of object instances.

5. A system according to claim 1, wherein the prerequisite checks comprise a data quality check and a data quantity check.

6. A method comprising:

receiving an instruction to determine whether an application executing on an application server is compatible with a machine learning scenario, the machine learning scenario comprising a machine learning model and a training pipeline;

determining a first plurality of object instances associated with the machine learning scenario, each of the first plurality of object instances comprising logic executable to perform a prerequisite check associated with the machine learning scenario and the application;

determining that the prerequisite check performed by execution of the logic of one of the first plurality of object instances requires a parameter value;

requesting the parameter value from an operator; and instructing a first object executor on the application server to execute the logic of the one of the first plurality of object instances based on the parameter value and to return corresponding first results.

7. A method according to claim 6, further comprising:

determining a second plurality of object instances associated with the machine learning scenario, each of the second plurality of object instances comprising logic executable to perform a prerequisite check associated with the machine learning scenario and a machine learning service providing the machine learning scenario; and instructing a second object executor on the machine learning service to execute the logic of the second plurality of object instances and return corresponding second results.

8. A method according to claim 7, further comprising:

determining, prior to instructing the second object executor on the machine learning service to execute the logic of the second plurality of object instances, that the prerequisite check performed by execution of the logic of one of the second plurality of object instances requires a second parameter value; and requesting the second parameter values from an operator, wherein instructing the second object executor on the machine learning service to execute the logic of the second plurality of object instances comprises instructing the second object executor to execute the logic of the one of the second plurality of object instances based on the second parameter value.

9. A method according to claim 6, wherein one of the first plurality of object instances is dependent on another one of the first plurality of object instances.

10. A method according to claim 6, wherein the prerequisite checks comprise a data quality check and a data quantity check.

11. A non-transitory medium storing processor-executable program code executable by a processing unit of a computing system to cause the computing system to:

receive an instruction from an operator to determine whether an application executing on an application server is compatible with a machine learning scenario, the machine learning scenario comprising a machine learning model and a training pipeline;

determine a first plurality of object instances associated with the machine learning scenario, each of the first plurality of object instances comprising logic executable by a first object executor executing in the application server to perform a prerequisite check associated with the machine learning scenario and the application;

determine that the prerequisite check performed by execution of the logic of one of the first plurality of object instances requires a parameter value;

request the parameter value from an operator;

instruct the first object executor to execute the logic of the one of the first plurality of object instances based on the parameter value; and receive first results corresponding to the executed logic from the first object executor.

12. A medium according to claim 11, the program code executable by a processing unit of a computing system to cause the computing system to:

determine a second plurality of object instances associated with the machine learning scenario, each of the second plurality of object instances comprising logic executable by a second object executor executing in a machine learning service providing the machine learning scenario to perform a prerequisite check associated with the machine learning scenario;

instruct the second object executor to execute the logic of the second plurality of object instances; and receive second results corresponding to the executed logic of the second plurality of object instances from the second object executor.

13. A medium according to claim 12, the program code executable by a processing unit of a computing system to cause the computing system to:

determine, prior to instructing the second object executor to execute the logic of the second plurality of object instances, that the prerequisite check performed by execution of the logic of one of the second plurality of object instances requires a second parameter value; and request the second parameter value from the operator, wherein instruction of the second object executor to execute the logic of the second plurality of object instances comprises instruction of the second object executor to execute the logic of the one of the second plurality of object instances based on the second parameter value.

14. A medium according to claim 11, wherein one of the first plurality of object instances is dependent on another one of the first plurality of object instances.

15. A medium according to claim 11, wherein the prerequisite checks comprise a data quality check and a data quantity check.

* * * * *